United States Patent
Schwiderski

(10) Patent No.: US 10,479,293 B2
(45) Date of Patent: Nov. 19, 2019

(54) MOUNTING ARRANGEMENT WITH KNOCK-OUTS FOR ACCOMMODATING ELONGATED INTERCONNECTION MEMBERS HAVING DIFFERENT PERIPHERIES

(71) Applicant: CNH Industrial America LLC, New Holland, PA (US)

(72) Inventor: Jason Matthew Schwiderski, Benson, MN (US)

(73) Assignee: CNH Industrial America LLC, New Holland, PA (US)

(*) Notice: Subject to any disclaimer, the term of this patent is extended or adjusted under 35 U.S.C. 154(b) by 93 days.

(21) Appl. No.: 15/814,998

(22) Filed: Nov. 16, 2017

(65) Prior Publication Data

US 2019/0143912 A1    May 16, 2019

(51) Int. Cl.
| | | |
|---|---|---|
| *B60R 16/02* | (2006.01) | |
| *F16L 3/233* | (2006.01) | |
| *F16L 3/06* | (2006.01) | |
| *F16L 3/04* | (2006.01) | |
| *H02G 3/32* | (2006.01) | |
| *H02G 3/22* | (2006.01) | |
| *H02G 3/08* | (2006.01) | |
| *F16L 55/035* | (2006.01) | |
| *H02G 3/00* | (2006.01) | |

(52) U.S. Cl.
CPC ............ *B60R 16/0215* (2013.01); *F16L 3/04* (2013.01); *F16L 3/06* (2013.01); *F16L 3/2338* (2013.01); *F16L 55/035* (2013.01); *H02G 3/083* (2013.01); *H02G 3/085* (2013.01); *H02G 3/22* (2013.01); *H02G 3/263* (2013.01); *H02G 3/32* (2013.01)

(58) Field of Classification Search
CPC .......... B60R 16/0215; F16L 3/04; F16L 3/06; F16L 55/035; H02G 3/085; H02G 3/083
See application file for complete search history.

(56) References Cited

U.S. PATENT DOCUMENTS 1,980,831 A * 11/1934 Rosenfield ............. H02G 3/085
                                                              220/284
3,288,407 A * 11/1966 Piper .................... H02G 3/0625
                                                               16/2.1

(Continued)

FOREIGN PATENT DOCUMENTS

AU        2007200987        9/2008

*Primary Examiner* — Tan Le
(74) *Attorney, Agent, or Firm* — Rebecca L. Henkel; Rickard K. DeMille

(57) ABSTRACT

A mounting arrangement and method for securing elongated interconnection members, such as wire and cable harnesses, rigid and flexible fluid lines, and the like, of different peripheries to a vehicle frame, utilize a mounting arrangement including a body defining a through-passage for securing an elongated interconnection member having a first periphery in the passage. The body also defines a mating and interlocking base block and a cap block that are separable along a parting line passing through the passage and separating the passage into a body segment and a cap segment of the passage. At least one of the body and cap segments of the passage includes a knock-out that can be broken out and separated from the body, to thereby adapt the passage to receive an elongated interconnection member having periphery that is different from the first periphery.

13 Claims, 2 Drawing Sheets

(56) References Cited

U.S. PATENT DOCUMENTS

| | | | |
|---|---|---|---|
| 3,873,759 A * | 3/1975 | Schindler | H02G 3/085 |
| | | | 174/666 |
| 4,542,871 A | 9/1985 | Fortsch | |
| 4,669,688 A | 6/1987 | Itoh et al. | |
| 4,865,280 A | 9/1989 | Wollar | |
| 4,881,705 A | 11/1989 | Kraus | |
| 5,024,405 A | 6/1991 | Mcguire | |
| 6,232,553 B1 * | 5/2001 | Regen | H02G 3/083 |
| | | | 174/350 |
| 6,425,543 B1 | 7/2002 | King | |
| 7,377,472 B2 | 5/2008 | Brown et al. | |
| 7,559,511 B2 | 7/2009 | Yon | |
| 7,856,746 B1 | 12/2010 | Araujo | |
| 7,922,020 B2 * | 4/2011 | Wronski | H02G 3/22 |
| | | | 220/3.2 |
| 8,430,365 B2 | 4/2013 | Benoit et al. | |
| 8,459,598 B2 | 6/2013 | Gardner | |
| 8,967,556 B2 | 3/2015 | Meyers et al. | |
| 9,010,063 B2 | 4/2015 | Spruiell | |
| 9,512,940 B2 | 12/2016 | Blakeley et al. | |
| 2007/0215757 A1 * | 9/2007 | Yuta | F16L 55/035 |
| | | | 248/68.1 |
| 2008/0093510 A1 | 4/2008 | Oh et al. | |

* cited by examiner

MOUNTING ARRANGEMENT WITH KNOCK-OUTS FOR ACCOMMODATING ELONGATED INTERCONNECTION MEMBERS HAVING DIFFERENT PERIPHERIES

FIELD OF THE INVENTION

This invention generally relates to mounting arrangements for securing elongated interconnection members, such as wire and cable harnesses, rigid and flexible fluid lines, and the like, to vehicle frames, and more particularly to such mounting arrangements for use in self-propelled agricultural product applicators.

BACKGROUND OF THE INVENTION

Modern vehicles such as self-propelled agricultural product applicators typically have long runs of wire, or fiber optic, cables and harnesses, that need to be routed along and secured to the frame. Modem vehicles also have systems for distributing hydraulic fluid, fuel, brake fluid or pressurized air, air conditioning coolant, or other fluids through a series of rigid pipes, often referred to as elongated interconnection members. Collectively such wire, optic fibers, wire and cable harnesses, rigid and flexible fluid lines, and the like are referred to herein as "elongated interconnection members."

Elongated interconnection members are typically attached periodically along their lengths to the frame, to provide support for long sections, and to secure the elongated interconnection members to the vehicle. In the past, such elongated interconnection members have been secured to the frame using commercially available wire, cable, hose and pipe clamps. Commercially available clamps are typically configured to secure elongated interconnection members having only a single periphery or cross section, i.e. round, and are usable only with elongated interconnection members having essentially identical cross-sectional shapes and similar sizes and peripheries. This requires vehicle manufacturers to carry a substantial inventory of sizes and shapes of clamps for any given vehicle, thereby undesirably driving up inventory stocking and storage costs, and increasing manufacturing complexity.

In the past, elongated interconnection members have also been bundled together with clamps or tie straps in a manner that is not aesthetically pleasing, and is conducive to the elongated interconnection members rubbing together and against the chassis, potentially leading to undesirable wear on the elongated interconnection members and the frame. Having the elongated interconnection members bundles together with one another makes them difficult to keep clean and prone to collecting dirt and corrosive chemicals, which can lead to undesirable corrosion of the elongated interconnection members.

Securing elongated interconnection members to the frame of a self-propelled agricultural applicator is particularly challenging, due to the unique configuration and operating environment of such machines. Such applicators are typically very large machines, carrying payloads weighing thousands of pounds of dry or liquid agricultural chemicals across uneven terrain at high speeds. The elongated interconnection members in such machines are long, and subject to high vibration loads. The operational environment is typically dusty, or muddy, and the chemicals applied tend to be corrosive. Such machines are often so called "high-boy" machines, having a chassis that is elevated several feet above the ground so that rows of partly grown crops can pass under the frame of the machine during operation, making it important that the elongated interconnection members be secured to the frame in locations where they will not become entangled with, or damage the crop passing below the frame. Also, because the frame of a high-boy-type applicator is several feet above the ground, the underside of the frame, and attached elongated interconnection members, are more readily visible than they would be in a typical over the road vehicle. As a result, it is more important to have the elongated interconnection members secured in a manner that is aesthetically pleasing and substantial.

It is desirable to provide an improved arrangement and method for mounting elongated interconnection members to a vehicle frame. It is especially desirable to have an improved mounting arrangement that can be readily reconfigured for securing elongated interconnection members having differing peripheries to a vehicle frame, to reduce inventory costs and facilitate assembly of the vehicle. It is also desirable to have an improved mounting arrangement that can be attached to the frame and/or secure one or more elongated interconnection members without using, or with minimal use of tools.

It is also desirable that such an improved mounting arrangement be rugged enough to meet the demands of service in a self-propelled agricultural applicator. Such rugged demands should desirably include having the capability to secure multiple elongated interconnection members in an array of elongated interconnection members that is structurally sound and aesthetically pleasing. It is also desirable that an improved mounting arrangement be capable of securely mounting multiple elongated interconnection members in a spaced-apart array that precludes the lines from rubbing against one another or the frame, and also facilitates washing and cleaning of the elongated interconnection members to remove dust, mud, debris and chemical residue. It is further highly desirable that an improved mounting arrangement facilitate installation of the elongated interconnection members in the vehicle, by supporting them in the desired position prior to the desired spaced-apart arrays of elongated interconnection members being secured in position.

BRIEF SUMMARY OF THE INVENTION

The invention provides a mounting arrangement and method for securing elongated interconnection members, such as wire and cable harnesses, rigid and flexible fluid lines, and the like, of different peripheries to a vehicle frame, utilizing a mounting arrangement that includes a body defining a through-passage for securing an elongated interconnection member having a first periphery in the passage. The body also defines a mating base block and a cap block that are separable along a parting line passing through the passage and separating the passage into a body segment and a cap segment of the passage. At least one of the body and cap segments of the passage includes a knock-out that can be broken out and separated from the body, to thereby adapt the passage to receive an elongated interconnection member having a periphery that is different from the first periphery.

A mounting arrangement for securing elongated interconnection members of different peripheries to a vehicle frame, according to the invention, may include a body of the mounting arrangement defining a passage therein for securing an elongated interconnection member having a first periphery in the passage, with the passage extending completely through the body along an axis of the passage and adapted for receipt in the passage of an elongated interconnection member having the first periphery. The body may also define a mating base block and a cap block of the body that are separable along a parting line of the body, with the parting line of the body passing through the passage and separating the passage into a body segment and a cap segment of the passage. At least one of the body and cap segments of the passage may include a knock-out that can be broken out and separated from the body, to thereby adapt the passage to receive an elongated interconnection member having a periphery that is different from the first periphery.

In some forms of the invention, the knock-out may include a plug portion and a breakable web portion, with the web portion connecting the plug portion to the remainder of the body.

At least one of the base and cap blocks may have an outer edge defining a mounting saddle for engaging and securing an elongated interconnection member, in some forms of the invention.

The body may also define an additional passage for an elongated interconnection member having a predetermined periphery, in some forms of the invention, with the parting line of the body passing through the additional passage and separating the additional passage into a body segment and a cap segment of the additional passage. The additional passage may, or may not include a knock-out that can be broken out and separated from the body, to thereby adapt the additional passage to receive an elongated interconnection member having a periphery that is different from the predetermined periphery.

In some forms of the invention, the base and cap blocks are cooperatively configured such that the cap block removably locks onto the base block in an assembled condition or the body. The base and cap blocks may include operatively cooperating locking channels and tongues configured such that the cap block can be slidingly removed from and attached to the base block. The operatively cooperating locking channels and tongues may be further configured for locking the cap block in place on the base block. Alternatively, the base and cap blocks may include operatively cooperating locking channels and tongues configured such that the cap black can be snapped on to, and snapped off of the base block, with the operatively cooperating locking channels and tongues being further configured for locking the cap block in place on the base block. In some forms of the invention, the base and cap blocks may be configured so that the cap block can either slidingly engage and disengage, or snap on and off of the base block.

The base block, in some forms of the invention, may be further adapted for attachment to a vehicle frame. The base block may include a pair of J-hooks having a barb at a distal end of at least one of the J-hooks for locking the base block onto a support structure. A mounting arrangement in accordance with the invention may further include a mounting bracket adapted for attachment of the base block to a vehicle frame. The base block may a pair of J-hooks having a barb at a distal end of at least one of the J-hooks for locking the base block onto the mounting bracket. The mounting bracket may a pair of slots for receiving the J-hooks and engaging the barb to lock the base block onto the mounting bracket.

The invention may also take the form of a method for securing elongated interconnection members of different peripheries to a vehicle frame, utilizing a mounting arrangement according to the invention for securing one or more elongated interconnection members having the same or different peripheries to the vehicle frame.

A method for securing elongated interconnection members of different peripheries to a vehicle frame, may include breaking out the knock-out in the body of the mounting arrangement, to thereby adapt the passage in the body to receive an elongated interconnection member having periphery that is different from the first periphery. A method may then further include securing an elongated interconnection member having periphery that is different from the first periphery in the passage from which the knock-out has been removed.

Other aspects, objects and advantages of the invention will be apparent from the following detailed description and accompanying drawings of exemplary embodiments.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention is described herein in connection with certain exemplary embodiments, there is no intent to limit it to those embodiments. On the contrary, the intent is to cover all alternatives, modifications and equivalents within the spirit and scope of the invention as defined by the appended claims.

DETAILED DESCRIPTION OF THE INVENTION

Figure 1:
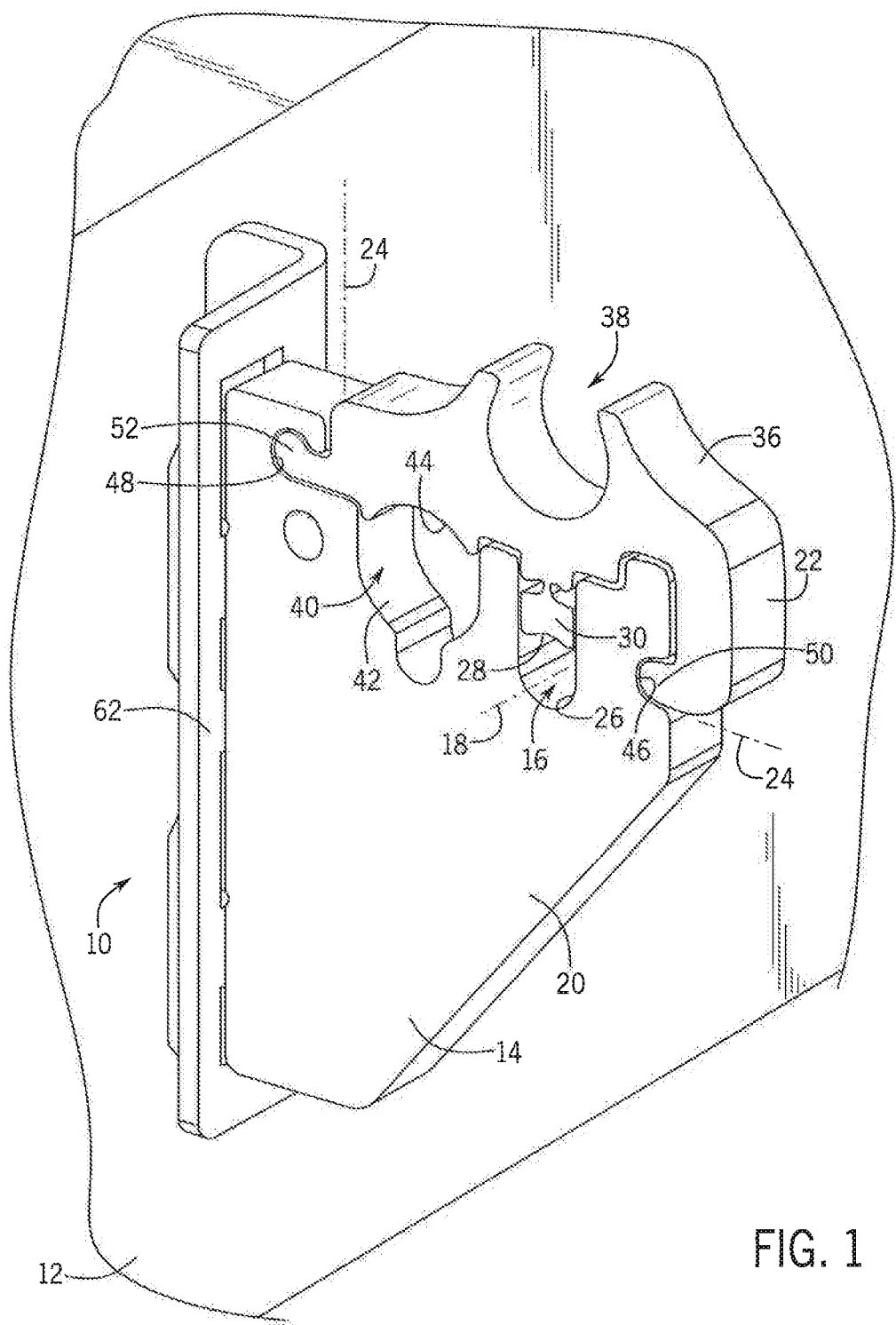
FIG. 1 is an isometric illustration of an exemplary embodiment of a mounting arrangement, according to the invention, in an assembled state, attached to a vehicle frame.
Figure 2:
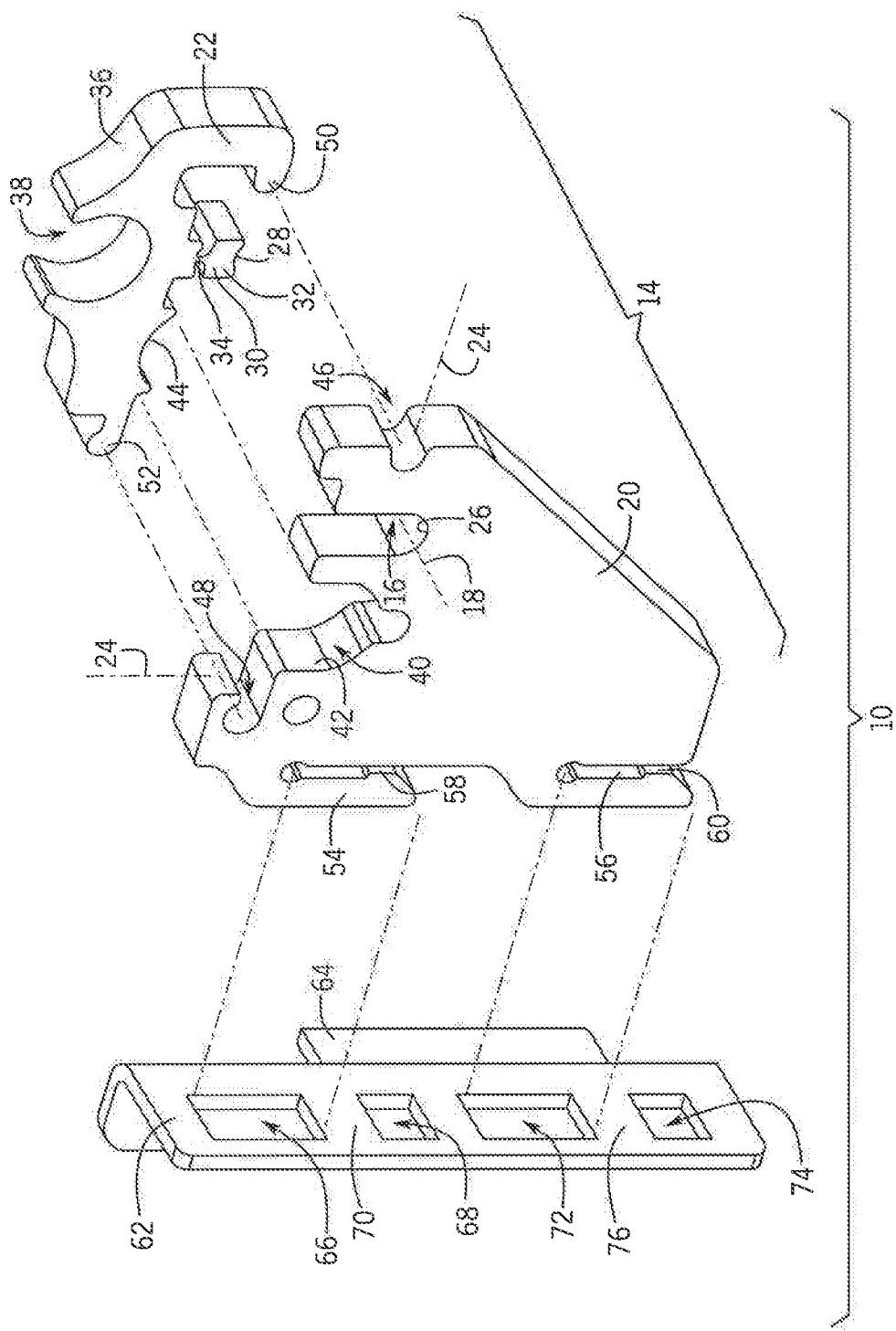
FIG. 2 is an exploded isometric illustration of the mounting arrangement of FIG. 1.

FIGS. 1 and 2 show an exemplary embodiment of a mounting arrangement 10 and method for securing elongated interconnection members (not shown), such as wire and cable harnesses, rigid and flexible fluid lines, and the like, of different peripheries to a vehicle frame 12. The term "elongated," as used herein, refers to the longitudinal axis or dimension, and not the cross-sectional dimension of members such as wire and cable harnesses, rigid and flexible fluid lines, and the like. The term "peripheries," as used herein refers generally to a size or shape of an outer surface of wire and cable harnesses, rigid and flexible fluid lines. The term "different peripheries" is intended to describe, for example, two fluid lines, or cables, having different outside diameters, or having differently shaped cross-sections, such as differing combinations of generally circular, rectangular, flat or oval shaped cross-sectional profiles.

The exemplary embodiment of the mounting arrangement 10 includes a body 14 of the mounting arrangement 10 that defines a passage 16, extending through the body 14, for securing an elongated interconnection member (not shown) having a first periphery in the passage 16. The passage 16 extends completely through the body 14 along an axis 18 of the passage 16, and is shaped and adapted for receipt in the passage 16 of an elongated interconnection member having the first periphery.

The body 14 also defines a mating base block 20 and a cap block 22 of the body 14 that are separable along a serpentine-shaped parting line 24 of the body 14, with the parting line 24 being represented by a broken line 24-24 in FIGS. 1 and 2. The parting line 24 of the body 14 passes through the passage 16, and separates the passage 16 into a body segment 26 and a cap segment 28 of the passage 16.

As best seen in FIG. 2, the cap segment 28 of the passage 26 in the cap block 22 of the exemplary embodiment of the mounting arrangement 10 is configured to include a knock-out 30 that can be broken out and separated from the cap block 22 of the body 14, to thereby adapt the passage 16 to receive an elongated interconnection member having periphery that is larger than the first periphery. The knock-out 30 includes a plug portion 32 and a breakable web portion 34, with the web portion 34 connecting the plug portion 32 to the remainder of cap block 22 of the body 14.

As shown in FIGS. 1 and 2, the cap block 22 of the exemplary embodiment of the mounting arrangement 10 also has an outer edge 36 that defines a mounting saddle 38 for engaging and securing an elongated interconnection member on the outer periphery of the cap block 22 of the body 14 of the mounting arrangement 10.

The body 14 of the exemplary embodiment also defines an additional passage 40 extending through the body 14, and adapted for receiving and securing an elongated interconnection member (not shown) having a pre-determined periphery. The parting line 24 of the body 14 passes through the additional passage 40 in a manner that separates the additional passage 40 into a body segment 42 and a cap segment 44 of the additional passage 40. The additional passage 40 in the exemplary embodiment does not include a knock-out, such as the knock-out 30 of the first passage 16, that can be broken out and separated from the body 14 for adapting the additional passage 40 to receive an elongated interconnection member having a periphery that is different from the pre-determined periphery.

The base and cap blocks 20,22 of the exemplary embodiment of the body 14 in the exemplary embodiment of the mounting arrangement 10 are cooperatively configured such that the cap block 22 removably locks onto the base block 20 in an assembled condition of the body 14. Specifically, the base and cap blocks 20,22 are configured by the parting line 24-24 to form first and second locking channels 46,48 in the base block 20, and first and second locking tongues 50,52 in the cap block 22, that are operatively and cooperatively configured such that the cap block 22 can be slidingly removed and attached to the base block 20 by sliding the cap block 22 in a direction generally parallel to the parting line 24, along the axis 18 of the passage 16. By virtue of their shape, once the cap block 22 is slid into place on the base bock 20, the locking channels 46,48 and tongues 50,52 lock the cap block 22 in place on the base block 20.

Alternatively, the base and cap blocks 20,22 of the exemplary embodiment are also configured of materials that allow the cap block 22 to flex in such a manner that the cap block 22 can be snapped on to, and snapped off of the base block 20, with the locking channels 46,48 and tongues 50,25 locking the cap block 22 in place after it is snapped onto the base block 20. In the exemplary embodiment of the mounting arrangement, the base and cap blocks 20,22 are configured so that the cap block 22 can either slidingly engage and disengage, or snap on and off of the base block 20, to provide options that significantly facilitate installation in, and removal of wire and cable harnesses, rigid and flexible fluid lines, and the like from the mounting arrangement 10.

The base block 20, in the exemplary embodiment is also adapted for attachment of the mounting arrangement 10 to the vehicle frame 12. Although it will be understood that, in some alternate embodiments of the invention, the base block 20 may include provisions such as integral mounting flanges or mounting holes for attaching the base bock 20 directly to a vehicle frame or other support structure, the base block 20 of the exemplary embodiment includes a pair of J-hooks 54,56 extending from the base block 20 of the body 14, and having barbs 58,60 at their respective distal ends for locking the base block 20 onto a support structure.

The exemplary embodiment of the mounting arrangement 10 further includes a mounting bracket 62 that is adapted for attachment of the base block 20 to the vehicle frame 12. Specifically, the mounting bracket 62 of the exemplary embodiment includes a mounting foot 64 for attaching the mounting bracket 62 to the frame 12.

The mounting bracket 62 also includes a first pair of long and short slots 66,68, separated by a web 70, for slidingly receiving the first J-hook 54 in the first long slot 66 and allowing the barb 58 of the first J-hook 54 to spring back out into the first short slot 68, to thereby allow the barb 58 to engage the web 70 between the first long and short slots 66,68 to lock the base block 20 onto the mounting bracket 62. In similar fashion, the mounting bracket 62 also includes a second pair of long and short slots 72,74, separated by a web 76, for slidingly receiving the second J-hook 56 in the second long slot 72, and allowing the barb 60 of the second J-hook 56 to spring back out into the second short slot 74, to thereby allow the barb 60 to engage the web 76 between the second long and short slots 72,74 to lock the base block 20 onto the mounting bracket 62.

From the foregoing description, those having skill in the art will appreciate that the invention provides an efficient and effective approach to securing e single or multiple elongated interconnection members of different peripheries to a vehicle frame. The exemplary embodiment provides additional advantages in that no tools are required in using the invention. The base block 20 snaps into the mounting bracket 62, and the cap block 22 slidingly engages or snaps onto the base block 20. Where it is desired to change the profile of a passage 16 through the body 14 of the mounting arrangement 10, the knock-out 30 can be simply broken out.

It will be further appreciated that, although the exemplary embodiment of the mounting arrangement 10 includes only one passage 16 having a knock-out, a single additional passage 40 not having a knock-out 30, and a single saddle 38 on an outer edge of the body 14, other embodiments with fewer or more of these elements are contemplated within the scope of the invention.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A mounting arrangement for securing elongated interconnection members of different peripheries to a vehicle frame, the mounting arrangement comprising:
    a body of the mounting arrangement defining a passage therein for securing an elongated interconnection member having a first periphery in the passage, with the passage extending completely through the body along an axis of the passage and adapted for receipt in the passage of the elongated interconnection member having the first periphery;
    the body also defining a mating base block and a cap block of the body that are separable along a parting line of the body;
    the parting line of the body passing through the passage and separating the passage into a body segment and a cap segment of the passage;
    at least one of the body and cap segments of the passage including a knock-out that can be broken out and separated from the body, to thereby adapt the passage to receive an elongated interconnection member having periphery that is different from the first periphery,
    wherein the base block is further adapted for attachment to a vehicle frame, and
    further including a mounting bracket adapted for attachment of the base block to a vehicle frame.

2. The mounting arrangement of claim 1, wherein the knock-out includes a plug portion and a breakable web portion, with the web portion connecting the plug portion to the remainder of the body.

3. The mounting arrangement of claim 1, wherein at least one of the base and cap blocks has an outer edge defining a mounting saddle for engaging and securing an elongated interconnection member.

4. The mounting arrangement of claim 1, wherein the body defines an additional passage for an elongated interconnection member, the parting line of the body passes through the additional passage and separates the additional passage into a body segment and a cap segment of the additional passage, and the additional passage does not include a knock-out.

5. The mounting arrangement of claim 1, wherein the base and cap blocks are cooperatively configured such that the cap block removably locks onto the base block in an assembled condition or the body.

6. The mounting arrangement of claim 5, wherein the base and cap blocks include operatively cooperating locking channels and tongues configured such that the cap block can be slidingly removed and attached to the base block, with the operatively cooperating locking channels and tongues being further configured for locking the cap block in place on the base block.

7. The mounting arrangement of claim 5, wherein the base and cap blocks include operatively cooperating locking channels and tongues configured such that the cap black can be snapped onto, and snapped off of the base block, with the operatively cooperating locking channels and tongues being further configured for locking the cap block in place on the base block.

8. The mounting arrangement of claim 1, wherein the base block includes a pair of J-hooks having a barb at a distal end of at least one of the J-hooks for locking the base block onto a support structure.

9. The mounting arrangement of claim 8, wherein the base block includes a pair of J-hooks having a barb at a distal end of at least one of the J-hooks for locking the base block onto the mounting bracket.

10. The mounting arrangement of claim 9, wherein the mounting bracket includes a pair of slots for receiving the J-hooks and engaging the barb to lock the base block onto the mounting bracket.

11. A mounting arrangement for securing elongated interconnection members of different peripheries to a vehicle frame, the mounting arrangement comprising:
    a body of the mounting arrangement defining a passage therein for securing an elongated interconnection member having a first periphery in the passage, with the passage extending completely through the body along an axis of the passage and adapted for receipt in the passage of the elongated interconnection member having the first periphery;
    the body also defining a mating base block and a cap block of the body that are separable along a parting line of the body;
    the parting line of the body passing through the passage and separating the passage into a body segment and a cap segment of the passage;
    at least one of the body and cap segments of the passage including a knock-out that can be broken out and separated from the body, to thereby adapt the passage to receive an elongated interconnection member having periphery that is different from the first periphery;
    the knock-out including a plug portion and a breakable web portion, with the web portion connecting the plug portion to the remainder of the body;
    the base and cap blocks also being cooperatively configured such that the cap block removably locks onto the base block in an assembled condition of the body,
    wherein the base and cap blocks include operatively cooperating locking channels and tongues configured for locking the cap block in place on the base block, and further configured such that the cap black can be slidingly removed and attached to the base block, and alternatively snapped onto, and snapped of the bast, block, and further including a mounting bracket adapted for attachment of the base block to a vehicle frame, and wherein:
    the base block includes a pair of J-hooks having a barb at a distal end of at least one of the J-hooks for locking the base block onto the mounting bracket; and
    the mounting bracket includes a pair of slots for receiving the J-hooks and engaging the barb to lock the base block onto the mounting bracket.

12. The mounting arrangement of claim 11, wherein the body defines an additional passage for an elongated interconnection member, the parting line of the body passes through the additional passage and separates the additional passage into a body segment and a cap segment of the additional passage, and the additional passage does not include a knock-out.

13. The mounting arrangement of claim 11, wherein at least one of the base and cap blocks has an outer edge defining a mounting saddle for engaging and securing an elongated interconnection member.

* * * * *